(12) United States Patent
Campbell et al.

(10) Patent No.: US 10,735,934 B2
(45) Date of Patent: *Aug. 4, 2020

(54) INTERACTIVE CLOSURE DEVICE AND BEVERAGE CONTAINER

(71) Applicant: PepsiCo, Inc., Purchase, NY (US)

(72) Inventors: Ryan Campbell, New York, NY (US); Bruno Telesca, Sandy Hook, CT (US)

(73) Assignee: PepsiCo, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,845

(22) Filed: Aug. 19, 2019

(65) Prior Publication Data

US 2020/0037138 A1 Jan. 30, 2020

Related U.S. Application Data

(63) Continuation of application No. 15/648,763, filed on Jul. 13, 2017, now Pat. No. 10,390,201.

(51) Int. Cl.
*H04W 4/80* (2018.01)
*H04B 5/00* (2006.01)
*G06K 19/077* (2006.01)
*B65D 1/02* (2006.01)
*B65D 51/24* (2006.01)
*B65D 41/04* (2006.01)
*B65B 7/28* (2006.01)
*G06K 19/073* (2006.01)
*H04W 4/21* (2018.01)

(52) U.S. Cl.
CPC ............ *H04W 4/80* (2018.02); *B65B 7/2835* (2013.01); *B65D 1/0246* (2013.01); *B65D 41/04* (2013.01); *B65D 51/245* (2013.01); *G06K 19/07345* (2013.01); *G06K 19/07758* (2013.01); *H04B 5/0037* (2013.01); *B65D 2203/10* (2013.01); *H04W 4/21* (2018.02)

(58) Field of Classification Search
CPC . H04W 4/80; H04B 5/0037; G06K 19/07758; G06K 19/07345; B65D 1/0246; B65D 51/245; B65D 2203/10
USPC ...................................... 206/459.1; 455/41.1
See application file for complete search history.

(56) References Cited

U.S. PATENT DOCUMENTS

| | | | |
|---|---|---|---|
| 6,859,745 | B2 | 2/2005 | Carr et al. |
| 10,390,201 | B2 * | 8/2019 | Campbell ........ G06K 19/07345 |
| 2002/0183883 | A1 | 12/2002 | Carr et al. |
| 2007/0152829 | A1 | 7/2007 | Lindsay et al. |
| 2014/0266760 | A1 | 9/2014 | Burke, Jr. et al. |
| 2015/0257981 | A1 | 9/2015 | Arad et al. |
| 2016/0165387 | A1 | 6/2016 | Nhu |

* cited by examiner

*Primary Examiner* — Ayodeji O Ayotunde (74) *Attorney, Agent, or Firm* — Sterne, Kessler, Goldstein & Fox P.L.L.C.

(57) ABSTRACT

An interactive beverage container includes a beverage container that defines an opening which may be sealed by a closure. The closure may further include circuitry that is configured to transmit data to a mobile device. When the closure is in a closed configuration with the closure attached to the opening, the circuitry does not transmit data to the mobile device and when the closure is in an open configuration with the closure removed from the opening, the circuitry transmits data to the mobile device. The data may include nutritional information, marketing materials, videos, track loyalty programs, and/or provide games or contests.

19 Claims, 9 Drawing Sheets

INTERACTIVE CLOSURE DEVICE AND BEVERAGE CONTAINER

CROSS-REFERENCE

This application is a continuation of U.S. patent application Ser. No. 15/648,763, filed Jul. 13, 2017, which is incorporated here in its entirety by reference thereto.

BACKGROUND

Field of the Invention

The present invention relates generally to beverage containers and communication between the beverage container and a customer's mobile device.

BRIEF SUMMARY

Aspects of the disclosure include an interactive beverage container. The beverage container includes a bottle, a cap for sealing an opening of the bottle, and circuitry attached to the cap. The circuitry is configured to transmit data over a broadcast area. In some embodiments, when the beverage container is closed by the cap, the broadcast area of the circuitry is not outside the bottle. In some embodiments, when the beverage container is open, the broadcast area extends out from the cap and the data can be received by a mobile device within the broadcast area.

In other aspects of the disclosure, a closure for a beverage container includes a top wall, an annular skirt extending downward from the top wall, and circuitry coupled to the top wall and configured to transmit radio signals to a mobile device. In some embodiments, the radio signals do not pass through the annular wall and are receivable by a mobile device only when the closure is not attached to a beverage container.

In other aspects of the disclosure, a method of transmitting data from a beverage container to a mobile device includes receiving power electromagnetically at a communication chip of a beverage container closure to activate the communication chip, and transmitting data from the communication chip only in a direction of an open end of the closure when the closure is not attached to a beverage container, the data receivable by a mobile device.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form part hereof, and in which is shown, by way of illustration, various embodiments in which aspects of the disclosure may be practiced. It is to be understood that other embodiments may be utilized and structural and functional modifications may be made, without departing from the scope of the present disclosure.

Sellers of products, such as beverages, may want to communicate with a mobile device (e.g., a smartphone or tablet) of a customer when the customer purchases or enjoys the product. The present disclosure describes a beverage container that includes a communication chip capable of sending data to a customer's mobile device, so that the customer can receive information from the seller through the chip's communication with the customer's device. For example, upon a beverage container being opened, the chip may send data including a message (or access to a message) to the customer informing the customer of the beverage's nutritional information or congratulating the customer on their excellent taste in choosing the beverage. The communication chip may send content (or access to content) such as audio or video to the customer. Or the chip may send marketing material such as advertisements or reward points to the mobile device of the customer.

Figure 1:
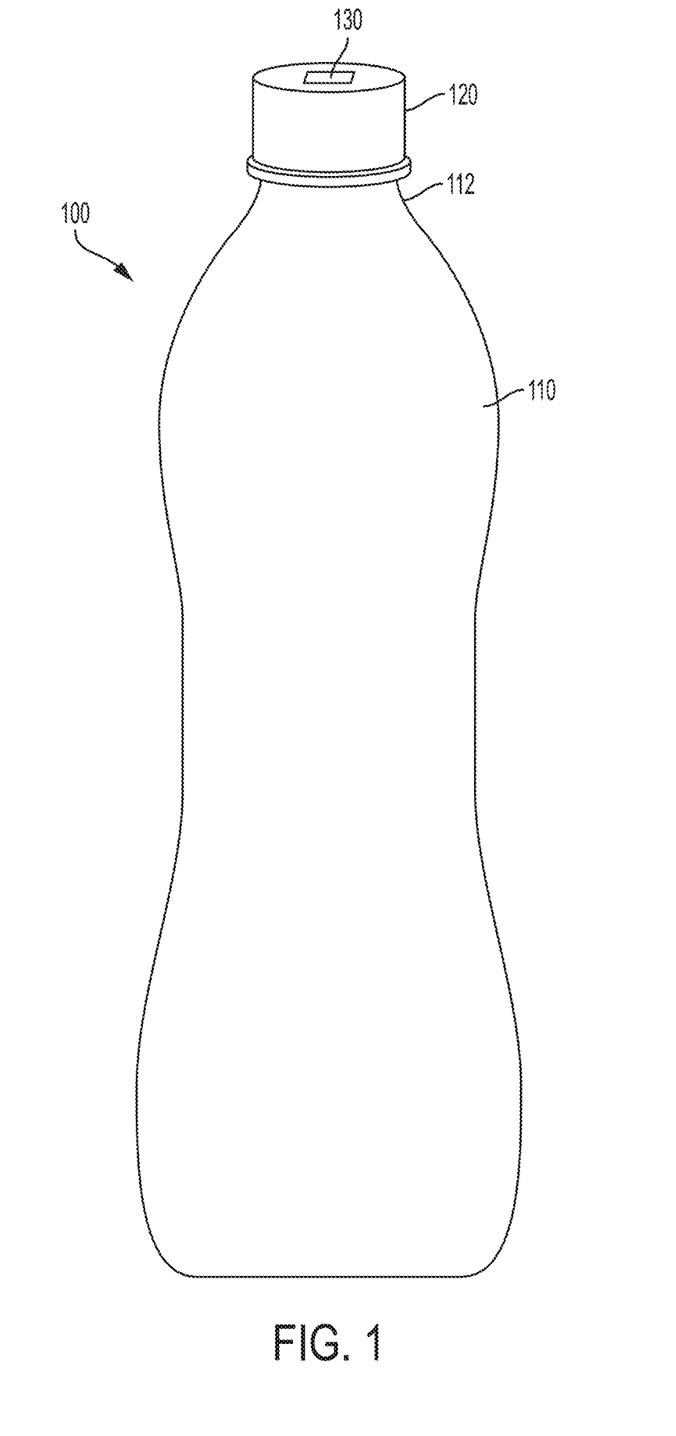
FIG. 1 illustrates a perspective view of an interactive beverage container.

FIG. 1 illustrates an interactive beverage container 100 in accordance with aspects of the present disclosure. Beverage container 100 may include a container or bottle 110 with an opening 240 (see FIG. 2) in a neck 112 of bottle 110. The size and geometry of bottle 110 may vary. Bottle 110 may hold a beverage (e.g., water, juice, soft drinks, iced tea, athletic beverages, energy drinks, etc.) for consumption. Beverage container 100 may further include a closure 120 (e.g., a bottle cap) for sealing opening 240 in neck 112 of bottle 110 to maintain the integrity of the beverage within. A variety of different types of closure devices may be used to seal opening 240. Closure 120 of bottle 110 may further include a communication chip 130 to communicate with a mobile device of the customer.

Figure 2:
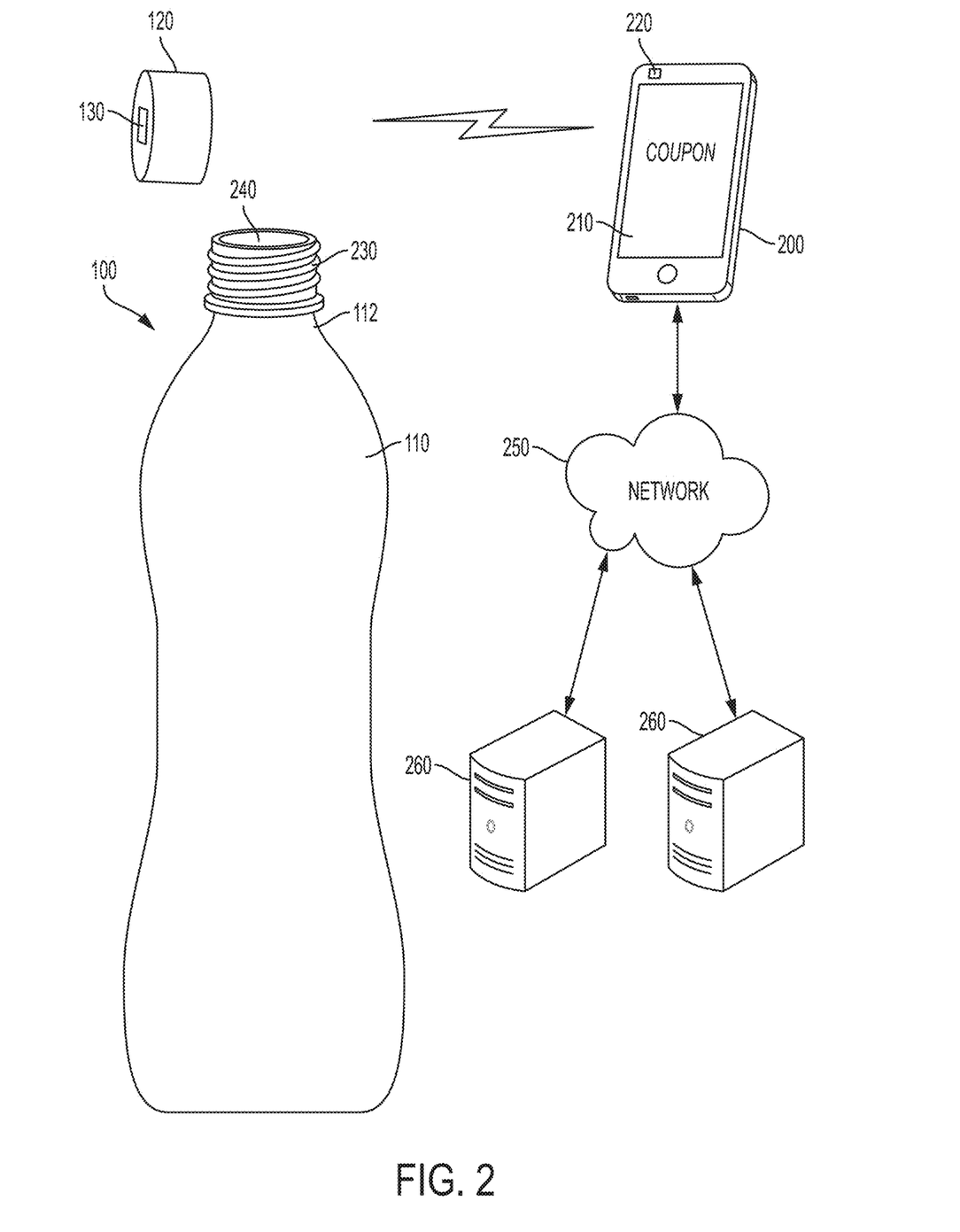
FIG. 2 illustrates the interactive beverage container of FIG. 1 with its cap removed along with a mobile communication device and network.

FIG. 2 illustrates an interactive beverage container 100 that includes bottle 110, closure 120, communication chip 130 and a mobile device 200. Mobile device 200 may include a display screen 210 and a corresponding communication chip 220. Communication chip 130 of closure 120 is configured to communicate with corresponding communication chip 220 of mobile device 200. Corresponding communication chips 130 and 220 may communicate with each other through RFID (radio frequency identification), NFC (near field communication), or any other suitable communication protocol. For example, communication chip 130 may be an NFC tag that uses a radio frequency (e.g., 13.56 MHz, which is a popular high-frequency standard for RFID and NFC transmissions) to communicate with corresponding communication chip 220 of mobile device 200.

Communication chip 130 may be circuitry, such as a printed electronic circuit that stores data to transfer to a customer. In some embodiments, the transfer of data to mobile device 200 relies of the native features of mobile device 200 and does not require a special application on mobile device 200 to initiate communication between communication chip 130 and communication chip 220. In some embodiments, the transfer of data to mobile device 200 relies on an application that was previously installed on mobile device 200. Communication between chips 130 and 220 simply needs close proximity to each other. For example, chips 130 and 220 may be less than 20 cm apart.

In some embodiments, communication chip 130 may include memory for storing data. The data may include specific types of content or information for accessing such content. For example, a link may be stored in the memory, such as a website URL, and the link may be transferred to corresponding communication chip 220 in mobile device 200. In some embodiments, communication chip 130 may transfer additional instructions for mobile device 200 to open certain programs (e.g., web browser, special application, etc.) to execute the link. Mobile device 200 may access the link on a server 260 through a network 250 (e.g., the Internet) to enable the customer to access content and display the content on display 210 of mobile device 200 or otherwise provide the content to the customer (e.g., through speakers of mobile device 200 in the case of content with an audio component). Mobile device 200 may access server 260 over network 250 by any means known and used in the art to transfer information, such as a wireless network, cellular network, Wi-Fi, Bluetooth, or any other similar wireless-type connection.

In some embodiments, communication chip 130 may be passive and not have its own power supply. Communication chip 130 may draw power from corresponding communication chip 220 in mobile device 200 through an electromagnetic field and transmit data to corresponding communication chip 220 after communication chip 130 has received power. Alternatively, communication chip 130 may be active and have its own power supply and may constantly or periodically transmit data without drawing external power. In addition, active communication chip 130 may participate in peer-to-peer communication with corresponding communication chip 220.

In some embodiments, communication between communication chips 130 and 220 only occurs after the customer has purchased and opened beverage container 100 by removing closure 120. This prevents the customer from accessing the data on communication chip 130 and corresponding content without paying for the product, since payment customarily occurs before a beverage is opened.

In some embodiments, after purchasing a beverage contained in beverage container 100 and opening closure 120, communication chip 130 may transfer data to communication chip 220 of mobile device 200 for access to content for the benefit of the customer. For example, content may include nutritional information, marketing materials, videos, reward points for loyalty programs, games or contests, and the like, thus enabling beverage container 100 to interact with the customer after purchase.

For example, after the customer purchases beverage container 100 and opens it by removing closure 120, communication chip 130 may transfer nutritional information (or access to nutritional information, e.g., if the information is stored on a remote server, as will be described in more detail below) to the customer's mobile device 200. Nutritional information may include serving size, servings per container, calories, total fat, sodium, carbohydrates, sugars, protein, daily percentage value, ingredients, and the like of the beverage. Since mobile device 200 does not require a special application on the customer's mobile device, once communication chip 220 comes within a predetermined distance of communication chip 130, the nutritional information simply appears on the customer's display screen 210 (optionally after the customer authorizes its appearance through a prompt or other authorization mechanism of their mobile device 200).

In another example, after the customer purchases beverage container 100 and opens closure 120, communication chip 130 may transfer marketing materials (or access to marketing materials) to the customer's mobile device 200. Marketing materials may include coupons, commercials, promotional materials, and the like. In some embodiments, the marketing materials are exclusive content and only available to customers who purchase the beverage.

In another example, after the customer purchases beverage container 100 and opens closure 120, communication chip 130 may transfer exclusive videos (or access to videos) to the customer's mobile device 200. In some embodiments, the videos are exclusive to customers who purchase the beverage and are not freely available via the internet, social media, or other resources. Videos may include videos from musicians, athletes, artists, models, and other various spokesmen for the beverage brand.

In another example, after the customer purchases beverage container 100 and opens closure 120, communication chip 130 may transfer and track loyalty points for the customer. The customer's mobile device 200 would act as the customer's loyalty card and may store and track the customer's loyalty points, or provide access to a database that does so. The customer may compile loyalty points and convert the loyalty points into various prizes or promotions.

In another example, after the customer purchases beverage container 100 and opens closure 120, communication chip 130 may transfer games (or access to games) or enter the customer into a sweepstakes or contest. For example, the customer may be automatically entered into an exclusive sweepstakes for a prize. Prizes may include promotional items, free beverages, tickets to a concert or athletic event, all-expense paid trips, and the like. In some embodiments, the customer may gain access to an exclusive game for their mobile device 200 or free access to a publically available game. In some embodiments, the customer may gain access to content such as characters, levels, in-game currency, or points for games, including for games that are publically available.

In some embodiments, the data transferred from communication chip 130 to the customer's mobile device 200 may be regulated by the geographic location of communication chip 130 or communication chip 220. For example, mobile device 200 may include a GPS (global positioning system) receiver that enables mobile device 200 to track its geographic location. When communication chip 130 of closure 120 and communication chip 220 of mobile device communicate, the data stored in the memory of communication chip 130 may be tailored to the geographic location of mobile device 200. For example, when communication chip 130 is read by communication chip 220, communication chip 220 may send both the data received from chip 130 and data relating to its own location to server 260 through network 250. Server 260 may recognize the data from chip 130 as being instructions to return content, and it may recognize content that it has access to that is associated with the location of mobile device 200. Server 260 can then transmit to mobile device 200 the content associated with the region that mobile device 200 is in.

For example, communication chip 130 may provide access to promotional materials for each team in a sports league. However, the promotional material for each team is only transferred to mobile device 200 if mobile device 200 is within a certain distance (e.g., a 200 mile radius) of the sports team or is closer to that sports team's home stadium than to the stadium of any other sports team in the league. Also for example, a country may be divided into specific geographic regions, and content relating to a specific geographic region is only transferred if mobile device 200 is within that specific geographic region.

In some embodiments, communication chip 130 may include a GPS receiver that tracks the location of closure 120. The GPS receiver of communication chip 130 regulates the data that is transferred based on the geographic location of communication chip 130, in the same way as described above for chip 220.

In some embodiments, communication chip 130 may tailor content transferred to the customer's mobile device 200 based on time and location. Mobile device 200 may include a GPS receiver, clock, and calendar, which track the location of mobile device 200, date, and time. The transfer of content to mobile device 200 may be tailored to the location, date, and time of the mobile device 200's receipt of data from communication chip 130. For example, when communication chip 130 is read by communication chip 220, communication chip 220 may send both the data received from chip 130 and data relating to the location, date, and time of mobile device 200 to server 260 through network 250. Server 260 may recognize the data from chip 130 as being instructions to return content and it may recognize content that it has access to that is associated with the location, date, and time of the mobile device 200. Accordingly, the content may only be transferred from server 260 to mobile device 200 at or in relation to a specific local event, such as a promotional event, sporting event, or concert. The time range may vary, for example, from a couple of days, to a couple of hours, to even a few minutes.

In another embodiment, promotional events may be based on a date and time range. For example, when communication chip 130 is read by communication chip 220, communication chip may send both the data received from chip 130 and data relating to the date and time of mobile device 200 to server 260 through network 250. Customer may gain access to a specific promotional event or prize based a specific date and time range of the promotion event. For example, customer may gain access to a buy one get one free promotional event that only runs for a week. In another example, the customer may enter a sweepstakes at a certain time range of the day (e.g., 10 AM-11 AM).

In some embodiments, communication chip 130 may include a GPS receiver, a clock, and a calendar that tracks the location, date, and time of closure 120. The GPS receiver, clock, and calendar of communication chip 130 may regulate the data that is transferred based on the geographic location of communication chip 130 and the date and time, in the same way as described above for chip 220.

Closure 120 may be attached to bottle 110 is variety of different manners. For example, FIG. 2 illustrates a threaded finish 230 on neck 112 of bottle 110. Closure 120 may have a corresponding threaded finish within closure 120. The customer may remove closure 120 from bottle 110 by unscrewing closure 120 from bottle 110. After filling bottle 110 with the beverage, closure 120 may be attached and sealed to bottle 110 to contain and maintain the integrity of the beverage. Additional types of closures may include crown top, snap on, friction fit, tamper-evident, and the like.

Figure 3A:
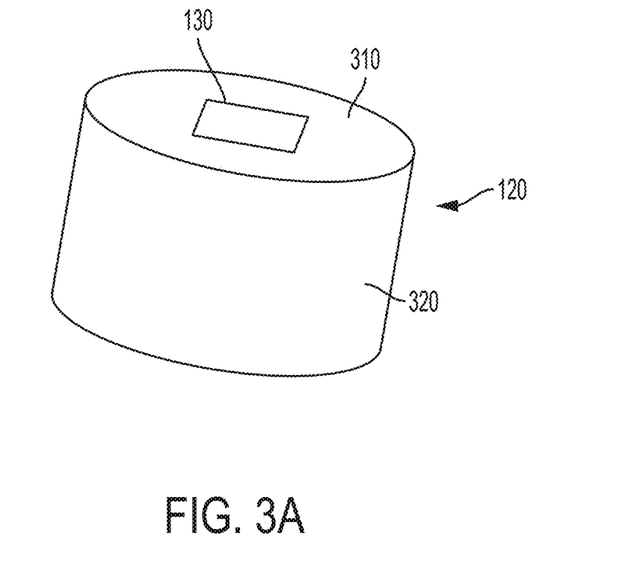
FIGS. 3A and 3B illustrate the cap of FIG. 2.
Figure 3B:
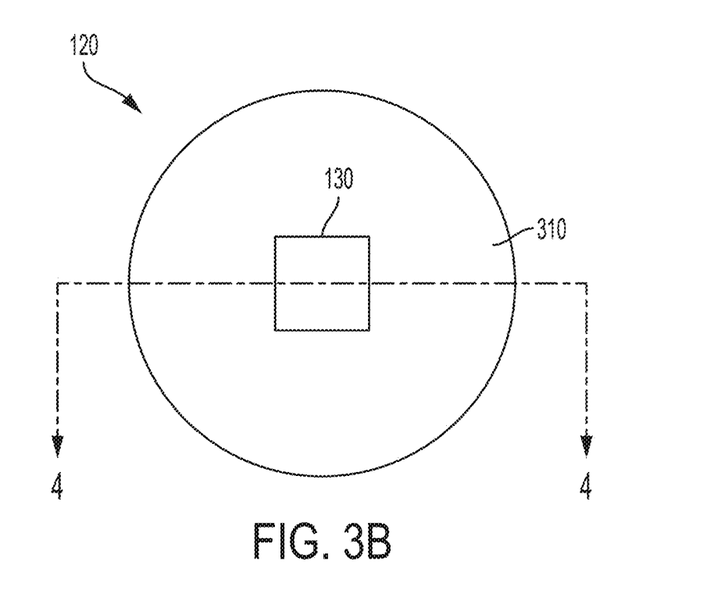

FIGS. 3A and 3B illustrate closure 120 in accordance in some embodiments. In some embodiments, closure 120 may include a top wall 310 and an annular skirt or outer wall 320 that functions as a side wall of closure 120. Annular skirt 320 is adapted to be secured to neck 112 of bottle 110. The inner surface of annular skirt 320 may include threads 410 (see FIGS. 4, 5, and 8) that correspond with threaded finish 230 of bottle 110.

Figure 4:
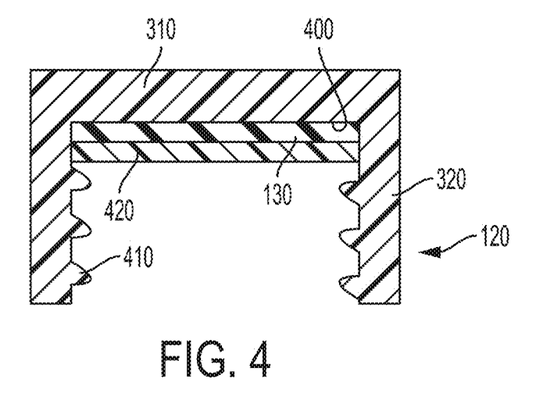
FIG. 4 illustrates a cross-sectional view of an embodiment of the cap of FIG. 2 taken along line 4-4 of FIG. 3 with a communication chip and a seal.

FIG. 4 illustrates a cross-sectional view of closure 120 in accordance with an embodiment taken along cross-sectional line 4-4 of FIG. 3B. Communication chip 130 may be secured to an underside 400 of top wall 310. Communication chip 130 may be secured to underside 400 by a hot-melt adhesive, film laminate, foam pouch, and the like. Communication chip 130 may also be attached to underside 400 of closure 120 by heat sealing, RF (radio-frequency) welding, mechanical attachments, and the like. Communication chip 130 may be sealed to underside 400 of closure 120 by a closure liner 420 within closure 120. Liner 420 may be fabricated from polyethylene terephthalate (PET) or other suitable material to seal communication chip 130 to underside 400 of closure to prevent communication chip 130 from coming in contact with the beverage in bottle 110 in order to maintain the integrity of the beverage and chip 130.

Figure 5:
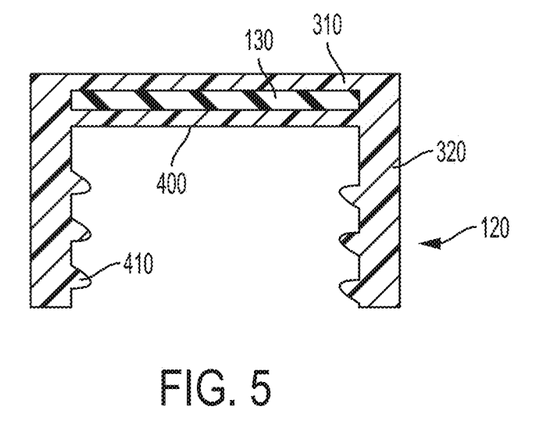
FIG. 5 illustrates a cross-sectional view of an embodiment of the cap of FIG. 2 taken along line 4-4 of FIG. 3 with a communication chip embedded within the cap.

FIG. 5 illustrates a cross-sectional view of closure 120 in accordance with an embodiment taken along cross-sectional line 4-4 of FIG. 3B. Communication chip 130 may be embedded within closure 120. In some embodiments, communication chip 130 may be embedded within top wall 310 of closure 120. In some embodiments, communication chip 130 may be embedded during the molding process of closure 120. In some embodiments, communication chip 130 may be embedded within annular skirt 320 of closure 120. Since communication chip 130 is embedded and sealed within closure 120, contact between communication chip 130 and the beverage within bottle 110 is prevented.

Figure 6:
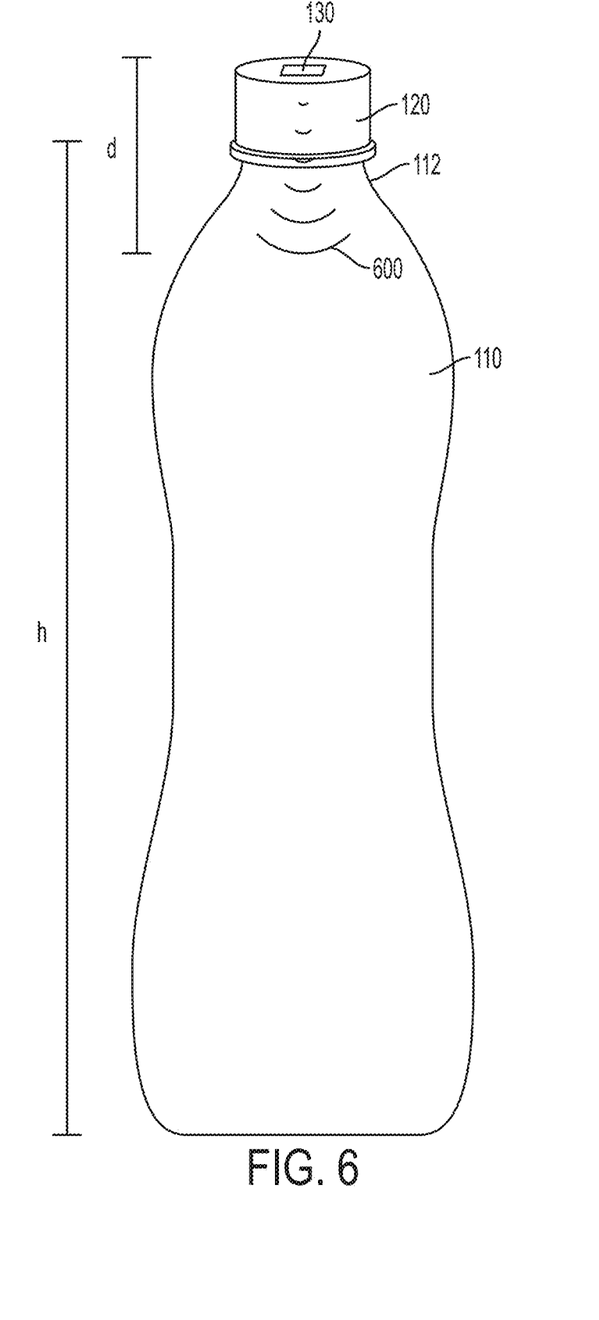
FIG. 6 illustrates an interactive beverage container with its communication chip broadcasting in a single direction.

In some embodiments, communication chip 130 is only able to communicate with corresponding communication chip 220 of mobile device 200 after closure 120 has been removed from bottle 110. In some embodiments, communication chip 130 only transmits a signal in a single direction (e.g., communication chip does not transmit in a direction 180 degrees from a direction in which it does transmit, for example, it transmits downward but not upward, or vice versa). For example, communication chip 130 may be an NFC tag that only transmits a signal in a single direction. FIG. 6 illustrates communication chip 130 transmitting a signal 600 in a single direction that is normal to underside 400 of closure 120. Signal 600 is transmitted toward the beverage within bottle 110. In order to minimize access to signal 600 before purchasing the beverage, signal 600 is only transmitted a short distance d, less than the height h of bottle 110. In some embodiments, distance d is less than 20 cm.

In order to further minimize access to signal 600, signal 600's lateral extents may be constrained to stay within side walls of bottle 110 (e.g., by constraining a transmission angle of signal 600 or by blocking portions of signal 600, as described in more detail below). Since signal 600 only travels narrowly and over a short distance, the customer's mobile device 200 is unable to receive signal 600 when closure 120 is attached to bottle 110, since the broadcast area of signal 600 is within bottle 110. As illustrated in FIG. 2, the customer's mobile device 200 is able to access the content on communication chip 130 only after the customer removes closure 120 from bottle 110 and directs underside 400 towards mobile device 200.

In some embodiments, communication chip 130 does not a have a power supply and relies on receiving power to transmit signal 600 from mobile device 200. In some embodiments, communication chip 130 is able to receive power from mobile device 200 from any direction; however, communication chip 130 only transmits signal 600 in a single direction that is normal to underside 400 of closure 120. In some embodiments communication chip 130 is only able to receive power from mobile device 200 when communication ship 220 is within broadcast area of signal 600, or from a single direction (e.g., from the same direction that communication chip 130 can transmit out from closure 120).

Figure 7:
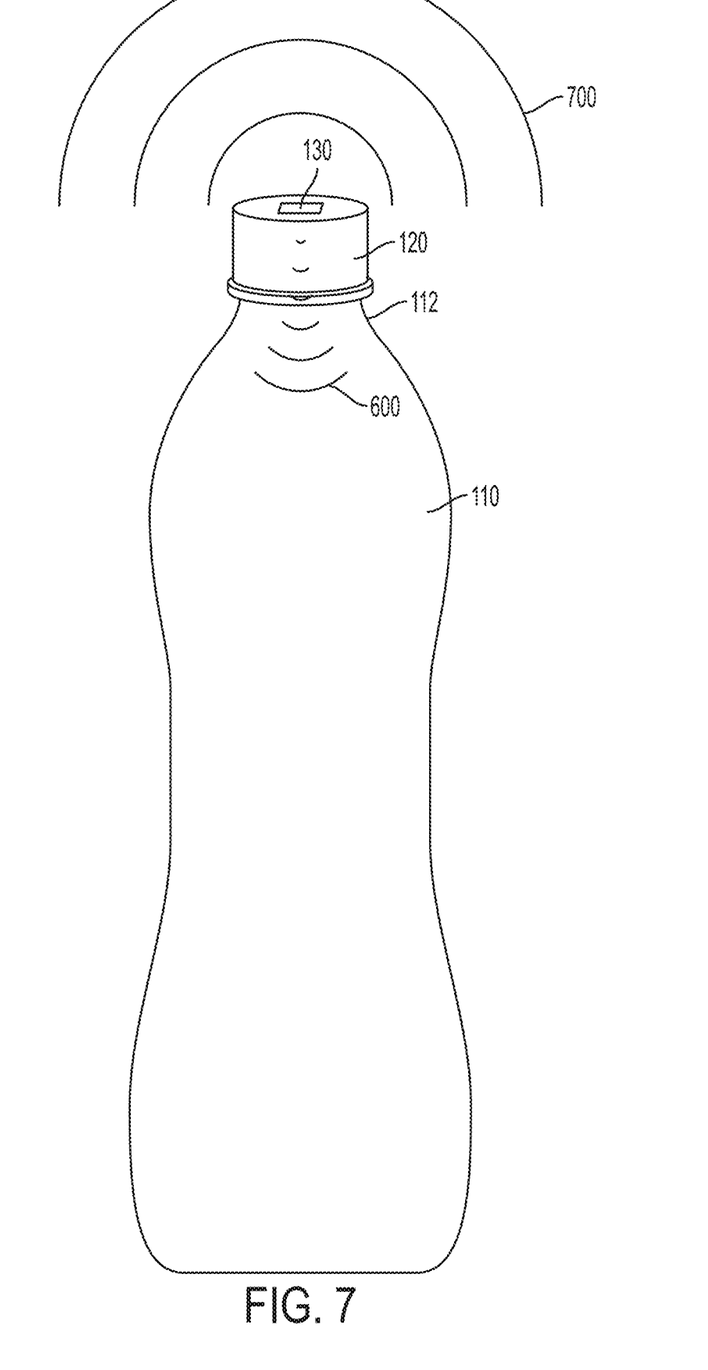
FIG. 7 illustrates an interactive beverage container with its communication chip broadcasting in two directions.

In some embodiments, communication chip 130 is able to transfer data in multiple (e.g., two) directions. FIG. 7 illustrates communication chip 130 transmitting signals 600 and 700 in two separate directions. Similar to FIG. 6, signal 600 is transmitted in a direction normal to underside 400 of closure 120. Communication chip 130 is also configured to transmit signal 700 in a separate direction away from closure 120 and bottle 110. These two different signals may transfer different types of data to the customer. In some embodiments, each of signal 600 and signal 700 is transmitted by a separate communication chip 130.

In some embodiments, signal 700 transfers data to the customer to access content before the customer purchases the beverage or removes the closure 120. This data is not exclusive to the purchase of the beverage and may enable the customer to access content such as promotional materials, commercials, and/or coupons on their mobile device 200 to entice the customer to purchase the beverage. In some embodiments, communication chip 130 may inform the customer the number of loyalty points, how many loyalty points they may receive if they purchase the beverage, and how many loyalty points they lack to receive a certain prize.

In some embodiments, signal 600 in FIG. 7 only transfers data to the customer after the customer has purchased the beverage. Similar to the signal 600 in FIG. 6, the data transferred by signal 600 provides access to exclusive content through network 250 for a customer who has purchased the beverage.

Figure 8:
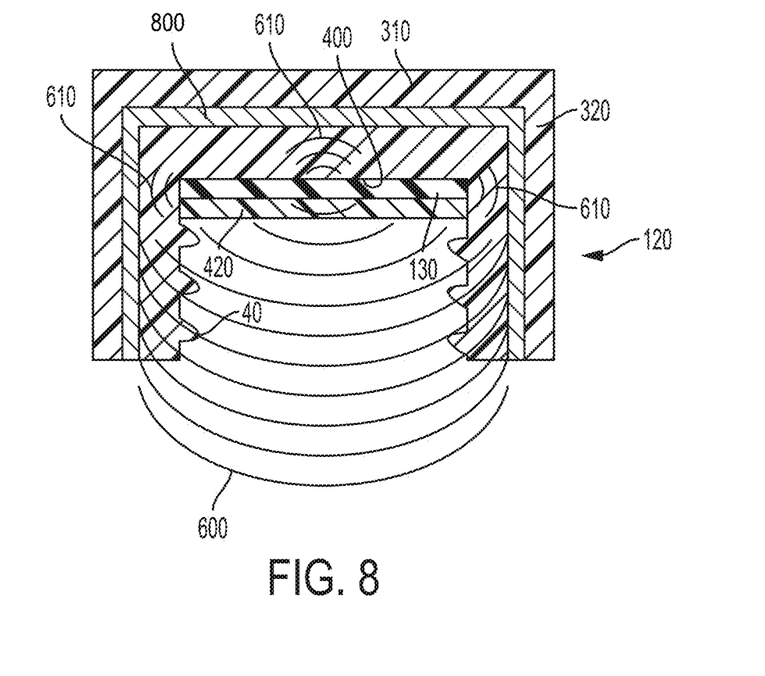
FIG. 8 illustrates a cross-sectional view of an embodiment of the cap of FIG. 2 taken along line 4-4 of FIG. 3 with a communication chip, a seal, and a shielding element.

In some embodiments, the direction of signal 600 from communication chip 130 may be limited in other ways. For example, FIG. 8 illustrates a cross-sectional view of closure 120 in accordance with an embodiment taken along cross-sectional line 4-4 of FIG. 3B. Similar to FIG. 4, closure 120 includes communication chip 130 secured to underside 400 of closure 120. Communication chip 130 is sealed within closure by liner 420. In some embodiments, closure 120 may further include a shielding element 800 that blocks, absorbs, or refracts signals 610 of communication chip 130 in all directions except in a direction normal to underside 400 of closure 120, toward the open end of closure 120 and into bottle 110 when closure 120 is attached to bottle 110. Shielding element 800 may be embedded within top wall 310 and annular skirt 320 and may circumferentially surround communication chip 130.

In some embodiments, shielding element 800 may be attached to the inner wall and underside 400 of closure 120 with communication chip 130 attached to the shielding element 800. Liner 420 may seal communication chip 130 to prevent contact of shielding element 800 with the beverage in bottle 110. In some embodiments, shielding element 800 may encompass the outer surface of closure 120. In some embodiments, shielding element 800 and communication chip 130 may both be embedded within closure 120.

Shielding element 800 may be an electrically conducting metal, such as aluminum, copper, and the like, that can reflect, absorb, or refract signals 610 transmitted by communication chip 130.

Figure 9:
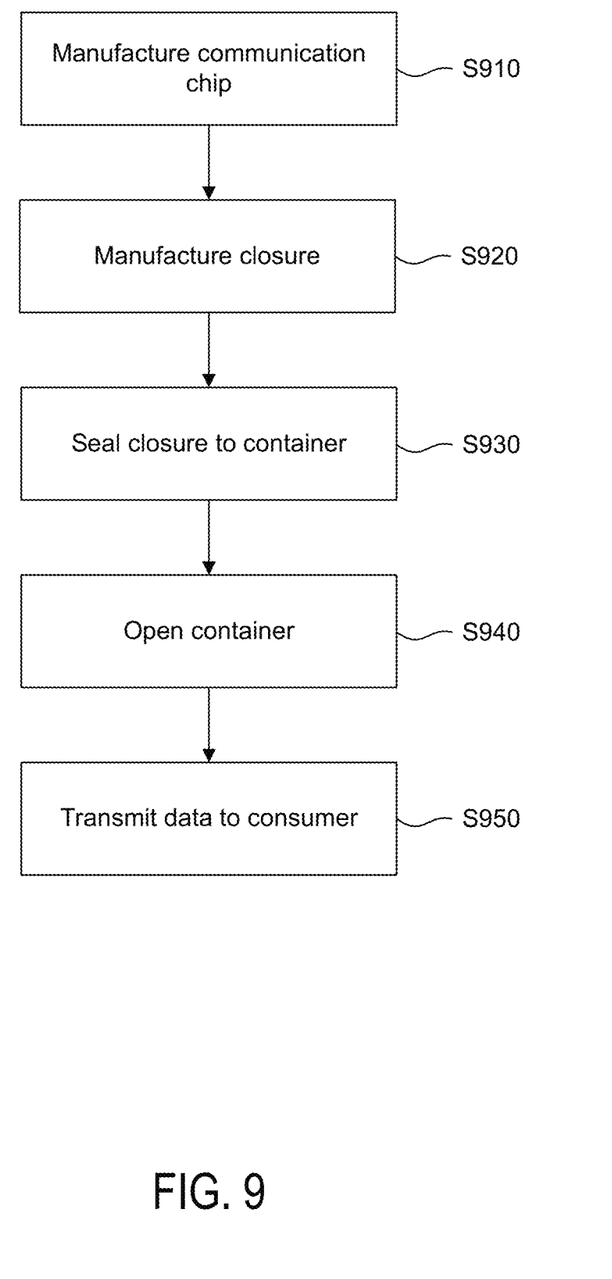
FIG. 9 illustrates a flowchart of transmission of data from an interactive beverage container.

FIG. 9 illustrates a flowchart transmission of data from communication chip 130 for communicating with corresponding communication chip 220 of mobile device 200. In S910, communication chip 130 is manufactured. Communication chip 130 may be a printed electronic circuit and may include a chip, an antenna, and an inlay. The memory of communication chip 130 may range from 64 bytes to 8 kilobytes. Communication chip 130 may be programmed with data at the time of manufacture, or communication chip 130 may be rewritable and reprogrammable any time after manufacturing. Accordingly, the data on communication chip 130 may be altered at any convenient point during the preparation of beverage container 100.

In S920, closure 120 is manufactured and includes communication chip 130. Closure 120 may be fabricated through various manufacturing processes, such as injection molding, compression molding, and the like. As discussed previously, communication chip 130 may be embedded within closure 120 or may be attached to underside 400 of closure.

In S930, after bottle 110 is filled with the beverage, closure 120 is attached and sealed to bottle 110 to preserve the integrity of the beverage within beverage bottle 110. When closure 120 is sealed, or in a closed configured with closure 120 attached to bottle 110, communication chip 130 does not communicate with corresponding communication chip 220 of mobile device 200.

In S940, the customer may purchase the beverage for consumption. In some embodiments, the beverage may be given away as a promotional item and not sold to the customer. In any case, closure 120 may be removed from bottle 110 to open bottle 110.

In S950, once closure 120 is removed from bottle 110 or beverage container 100 in an open configuration, communication chip 130 may transmit data to corresponding communication chip 220 of mobile device 200 if mobile device 200 is within a predetermined distance, such as, for example, 10 cm or 20 cm. As discussed previously, communication chip 130 may transmit data or provide access to content on server 260 through network 250 to mobile device 200.

Figure 10:
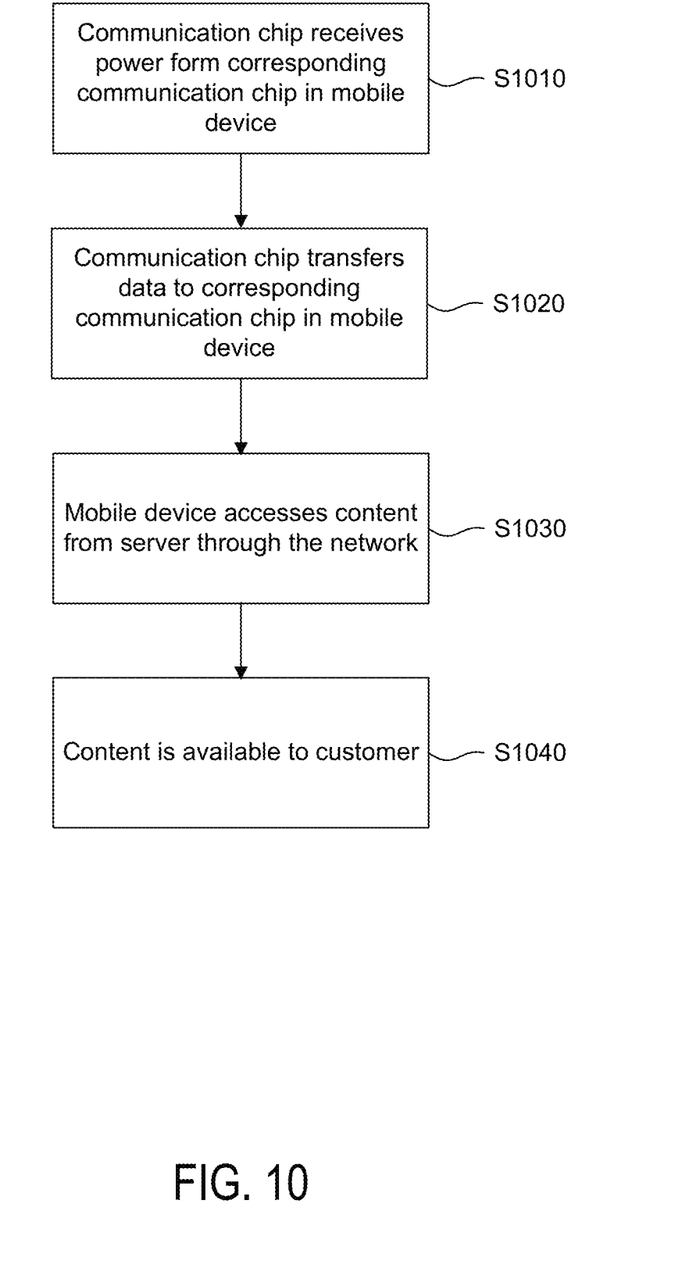
FIG. 10 illustrates a flowchart of communication between a communication chip in a cap and a customer's mobile device.

FIG. 10 illustrates a flowchart of how communication chip 130 interacts with mobile device 200. In some embodiments, communication chip 130 is a passive chip and receives power over an electromagnetic field. In S1010, communication chip 130 receives power from a mobile device 200 when power is transmitted over the electromagnetic field to provide power to communication chip 130. Power may only be transmitted to communication chip 130 if mobile device 200 is within a predetermined distance, such as, for example, 10 cm or 20 cm.

In S1020, once communication chip 130 receives power, communication chip 130 transmits data to corresponding communication chip 220. Data may be transferred over a radio frequency, such as 13.56 MHz, for example. As described previously, data is transferred after customer has removed closure 120 from bottle 110.

In S1030, mobile device 200 accesses content from server 260 through network 250 based on data received from communication chip 130. Mobile device 200 recognizes the data as instructions to access content from server 260 through network 250. Mobile device may access network 250 through a wireless network, cellular network, Wi-Fi, Bluetooth, or any other similar wireless-type connection.

In some embodiments, the data transferred from communication chip 130 to mobile device 200 is itself content that can be output to the customer through mobile device 200. In such embodiments S1030 may be omitted. It should be understood that all embodiments described herein may be adapted so that the content accessed by mobile device 200 directly from communication chip 130 or through network 250 based on data received from communication chip 130. The decision as to which option to use may depend on any relevant consideration, such as, for example, the size of the data (e.g., if it is too much to economically fit in a memory of communication chip 130), availability of wireless networks, or the desired ability to monitor or track sales or access of content.

In S1040, mobile device 200 has access to the content and the content is available to the customer. Content may be outputted by mobile device 200 to the customer (e.g., display 210, speaker, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. An interactive beverage container, comprising:
   a bottle;
   a cap for closing the bottle; and
   circuitry configured to transmit data in a first direction, wherein the circuitry does not transmit data in a second direction, wherein the second direction is 180 degrees from the first direction, and
   wherein the first direction is toward an interior of the bottle when the bottle is closed by the cap.

2. The interactive beverage container of claim 1, wherein the data is transmitted by radio frequency.

3. The interactive beverage container of claim 1, wherein the cap comprises the circuitry, and
   wherein the first direction is normal to an underside of the cap.

4. The interactive beverage container of claim 1, wherein the circuitry does not transmit data outside the bottle when the bottle is closed by the cap.

5. The interactive beverage container of claim 1, wherein the circuitry does not transmit data a distance greater than a height of the bottle.

6. The interactive beverage container of claim 1, wherein the cap comprises a data-signal shielding element.

7. The interactive beverage container of claim 1, wherein the data transmitted from the circuitry enables a mobile device receiving the data when the bottle is not closed by the cap to access audio or video content over a network.

8. The interactive beverage container of claim 1, wherein the data transmitted from the circuitry enables a mobile device receiving the data when the bottle is not closed by the cap to access content over a network, and
   wherein the content is dependent on the geographic location of the mobile device.

9. The interactive beverage container of claim 1, wherein the data transmitted from the circuitry enables a mobile device receiving the data when the bottle is not closed by the cap to access content over a network, and
   wherein the content is dependent on the time of access to the content by the mobile device.

10. The interactive beverage container of claim 1, wherein the circuitry is an NFC tag.

11. A closure for a beverage container, the closure comprising:
    circuitry configured to transmit radio signals; and
    a shielding element that prevents transmission of the radio signals through the closure.

12. The closure of claim 11, further comprising:
    a top wall; and
    an annular skirt,
    wherein the shielding element is coupled to at least one of the top wall and the annular skirt.

13. The closure of claim 12, wherein the circuitry is attached and sealed to an underside of the top wall.

14. The closure of claim 11, further comprising:
    a top wall; and
    an annular skirt,
    wherein the shielding element is embedded within at least one of the top wall and the annular skirt.

15. A bottle, comprising:
    the closure of claim 11,
    wherein the circuitry is configured to transmit the radio signals toward and within the bottle when the closure is secured to the bottle.

16. The bottle of claim 15, wherein the circuitry is configured to transmit the radio signals no farther than the maximum height of the bottle.

17. A method of transmitting data from a beverage container to a mobile device, the method comprising:
    activating a communication chip of a beverage container, the beverage container comprising a closure; and
    transmitting data from the communication chip in an area where the data is receivable by a mobile device only when the closure is not attached to a beverage container.

18. The method of transmitting data of claim 17, wherein the communication chip transmits the data in a direction normal to an underside of the closure.

19. The method of transmitting data of claim 17, further comprising transmitting second data from the communication chip in an area where the data is receivable by a mobile device when the closure is attached to a beverage container, wherein the second data is different from the first data.

* * * * *